US012736852B2

(12) United States Patent
Nakayama

(10) Patent No.: US 12,736,852 B2
(45) Date of Patent: Sep. 15, 2026

(54) OPTICAL IMAGE STABILIZATION APPARATUS, LENS APPARATUS, AND IMAGE CAPTURING APPARATUS

(71) Applicant: CANON KABUSHIKI KAISHA, Tokyo (JP)

(72) Inventor: Wataru Nakayama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 18/927,571

(22) Filed: Oct. 25, 2024

(65) Prior Publication Data

US 2025/0138391 A1 May 1, 2025

(30) Foreign Application Priority Data

Nov. 1, 2023 (JP) ................................ 2023-187537

(51) Int. Cl.
*G03B 5/00* (2021.01)
*G02B 7/10* (2021.01)

(52) U.S. Cl.
CPC ............... *G03B 5/00* (2013.01); *G02B 7/102* (2013.01); *G03B 2205/0069* (2013.01)

(58) Field of Classification Search
CPC .............. G03B 5/00; G03B 2205/0069; G02B 7/102
See application file for complete search history.

(56) References Cited

U.S. PATENT DOCUMENTS 8,896,711 B2 * 11/2014 Akutsu .................. G03B 17/14 348/208.99
9,529,209 B2 * 12/2016 Nakamura ........... G02B 27/646
11,740,484 B2 * 8/2023 Fukushima .......... G02B 27/646 359/554
12,598,387 B2 * 4/2026 Nakayama ............... G02B 7/02
2010/0166401 A1 * 7/2010 Akutsu .................... G03B 5/00 359/557
2013/0163973 A1 * 6/2013 Tanaka ............... H04N 23/6812 359/557
2020/0077001 A1 * 3/2020 Nakahara ................. G03B 5/00

FOREIGN PATENT DOCUMENTS

JP 2011113053 A 6/2011
JP 2011180519 A 9/2011
JP 2013140252 A 7/2013
JP 2014228621 A 12/2014
JP 2016184132 A 10/2016

* cited by examiner

*Primary Examiner* — Shahbaz Nazrul

(74) *Attorney, Agent, or Firm* — Canon U.S.A., Inc. IP Division

(57) ABSTRACT

An optical image stabilization apparatus includes a movable member configured to hold an optical element, a base member configured to hold the movable member, a first position detection unit configured to detect a position of the movable member, and a first driving unit configured to drive the movable member. The first driving unit includes a coil and a magnet that is arranged at a position facing a direction along the optical axis with respect to the coil. The first position detection unit is arranged at a position facing the direction along the optical axis with respect to the magnet and detects a position of the movable member in a direction of the first detection axis by detecting a change in a position of the magnet. As viewed along the optical axis, the first detection axis is inclined to the first drive axis.

12 Claims, 5 Drawing Sheets

11
14
15
13
12
OA
(OPTICAL
AXIS)

200
L1
531
511
501
521
502
532
512
522
300
300
400
400
210
621
622

Y
X
θ
α1
α2
OA(LC)
501
601
602
502
ΔB
(xs1,ys1)
(PRESENT EXEMPLARY EMBODIMENT)

Y
X
θ
α1'
α2'
OA(LC)
501'
601'
602'
502'
ΔA
(xs1',ys1')
(COMPARATIVE EXAMPLE)

OPTICAL IMAGE STABILIZATION APPARATUS, LENS APPARATUS, AND IMAGE CAPTURING APPARATUS

BACKGROUND

Technical Field

The present disclosure relates to an optical image stabilization apparatus, a lens apparatus, and an image capturing apparatus.

Description of the Related Art

Conventionally, in order to prevent image blur caused by hand shake or the like, an optical image stabilization apparatus has been discussed that realizes image blur correction by detecting camera shake information using a shake detection unit and driving a correction lens in a direction including a component orthogonal to an optical axis based on a detection result. Lens apparatuses and image capturing apparatuses equipped with the optical image stabilization apparatus are required to be further miniaturized to improve portability and storability.

According to Japanese Patent Application Laid-Open No. 2016-184132, a configuration is discussed in which a Hall element, which is a position detection unit of a correction lens, is arranged in a hollow core portion of a coil, which is a driving unit of the correction lens, and a magnet for position detection is also used as a driving magnet in order to miniaturize the optical image stabilization apparatus.

According to Japanese Patent Application Laid-Open No. 2011-180519, an optical image stabilization apparatus is discussed in which three actuators drive a movable member and three position sensors detect a position of the movable member. In the optical image stabilization apparatus, driving directions of the three actuators and detection directions of the three position sensors coincide with each other.

SUMMARY

According to an aspect of the present disclosure, an optical image stabilization apparatus includes a movable member configured to hold an optical element, a base member configured to hold the movable member to be movable in a direction including a component orthogonal to an optical axis of the optical element, a first position detection unit configured to detect a position of the movable member with respect to the base member in a direction of a first detection axis parallel to a plane orthogonal to the optical axis, and a first driving unit configured to drive the movable member with respect to the base member in a direction of a first drive axis parallel to the plane orthogonal to the optical axis, wherein the first driving unit includes a coil and a magnet that is arranged at a position facing a direction along the optical axis with respect to the coil, wherein the first position detection unit is arranged at a position facing the direction along the optical axis with respect to the magnet and detects a position of the movable member in a direction of the first detection axis by detecting a change in a position of the magnet, and wherein, as viewed along the optical axis, the first detection axis is inclined with respect to the first drive axis.

Further features of the present disclosure will become apparent from the following description of exemplary embodiments with reference to the attached drawings.

DESCRIPTION OF THE EMBODIMENTS

Figure 1:
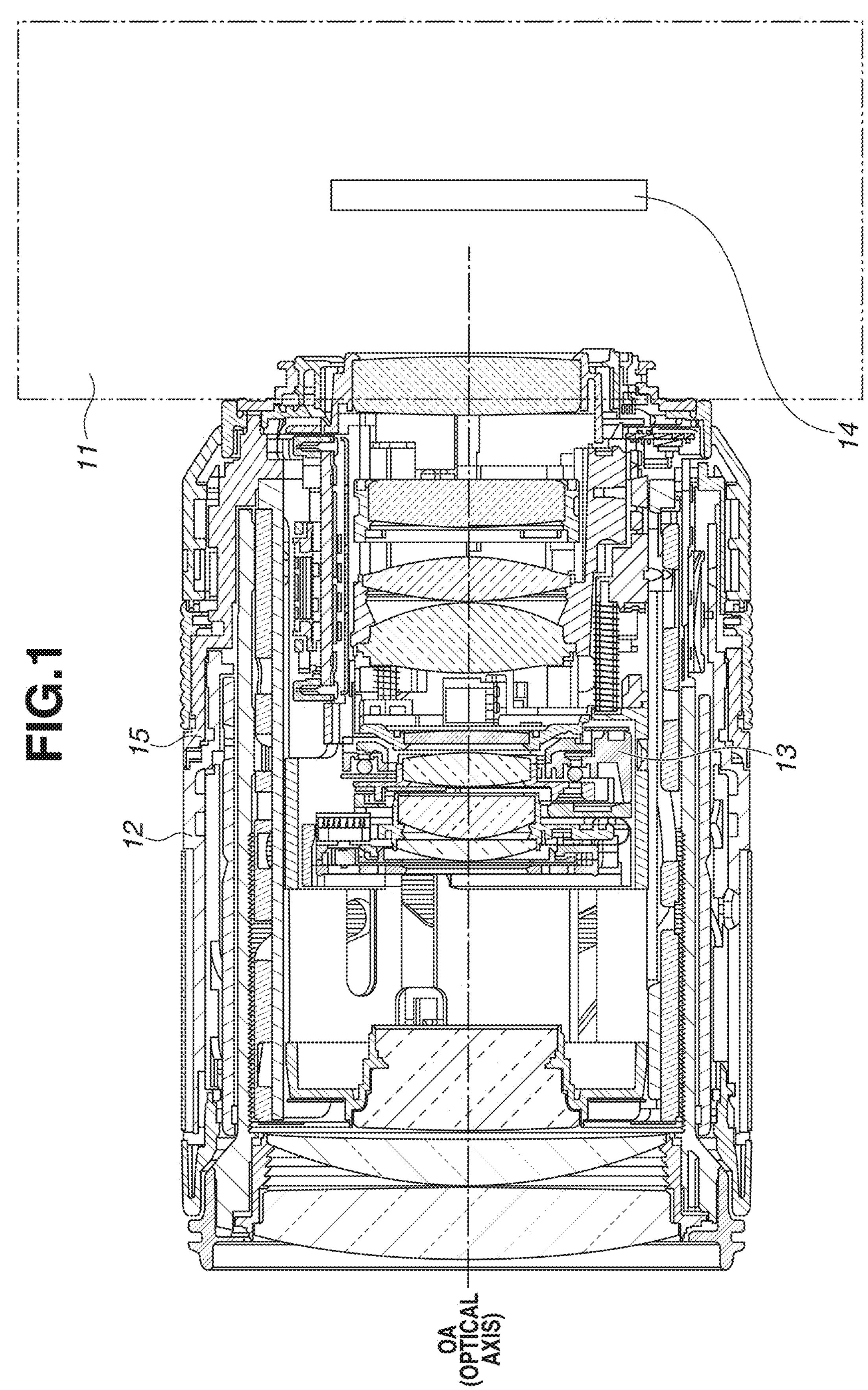
FIG. 1 illustrates a configuration of a camera system including a lens apparatus.

Exemplary embodiments of the present disclosure will be described in detail with reference to the attached drawings. The same reference numerals are used for the same members throughout the drawings to avoid repetition in descriptions.

(Configuration of Camera System)

A configuration of a camera system 1 including a lens apparatus 12 equipped with an optical image stabilization apparatus (image blur correction apparatus) and an image capturing apparatus 11 according to an exemplary embodiment of the present disclosure is described with reference to FIG. 1.

FIG. 1 illustrates the configuration of the camera system 1 according to the exemplary embodiment of the present disclosure. The camera system 1 includes the image capturing apparatus 11 and the lens apparatus 12 that is detachable from the image capturing apparatus 11. The image capturing apparatus 11 as an optical apparatus may be integrated with a lens.

The image capturing apparatus 11 photoelectrically converts (captures) an object image formed by an imaging optical system accommodated in a lens barrel 15 of the lens apparatus 12 using an imaging element 14 formed of a charge coupled device (CCD) sensor, a complementary metal oxide semiconductor (CMOS) sensor, or the like to generate an image signal. The lens apparatus 12 includes an image stabilization unit 13, which is accommodated in the lens barrel 15 and serves as an optical image stabilization apparatus (image blur correction apparatus) described below, and the image stabilization unit 13 and the imaging optical system have an optical axis OA extending toward an object side (subject side) and an image side. In the following description, a direction (extending) along the optical axis OA is referred to as an optical axis direction.

Figure 2:
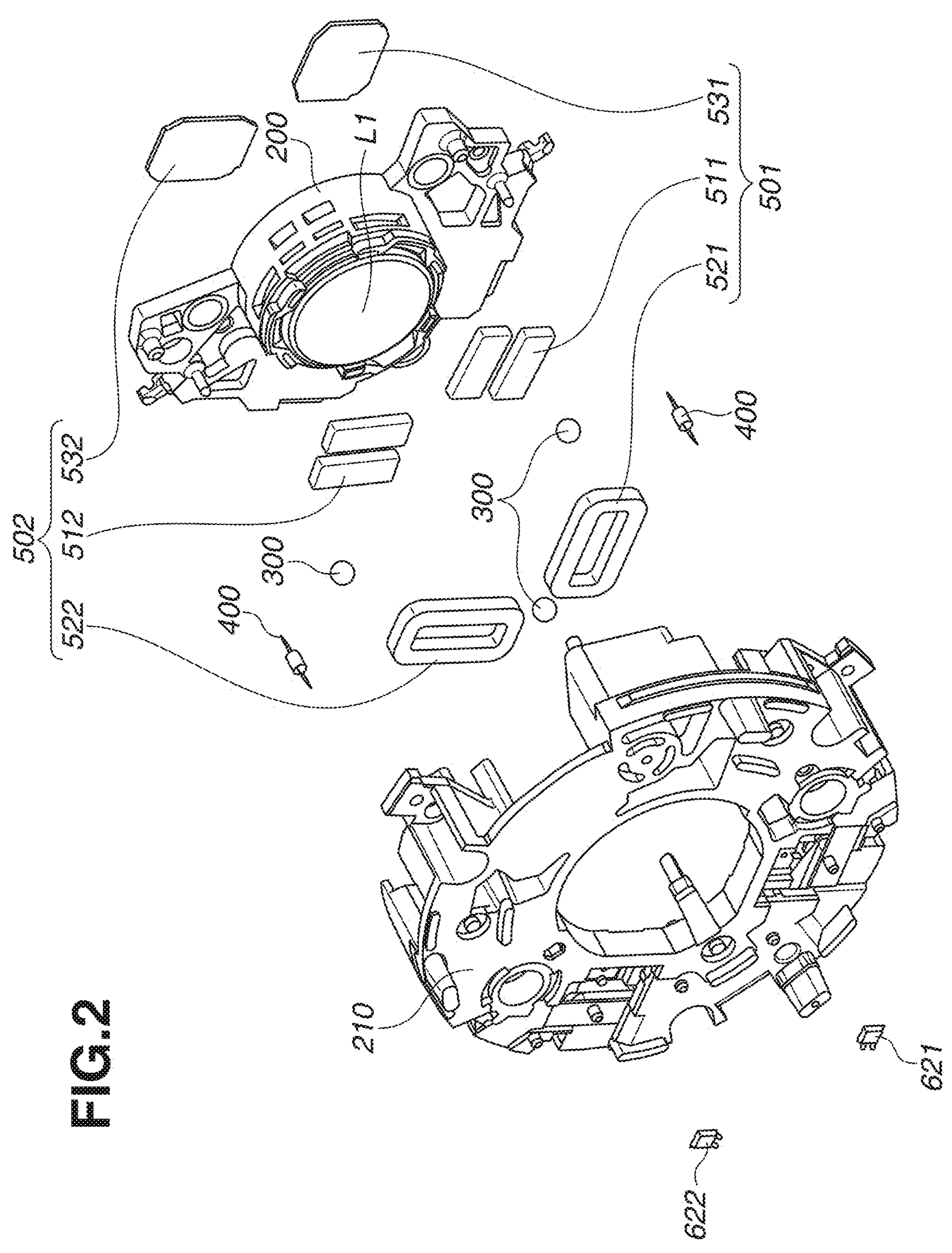
FIG. 2 is an exploded perspective view of an optical image stabilization apparatus as viewed from an object side.
Figure 3:
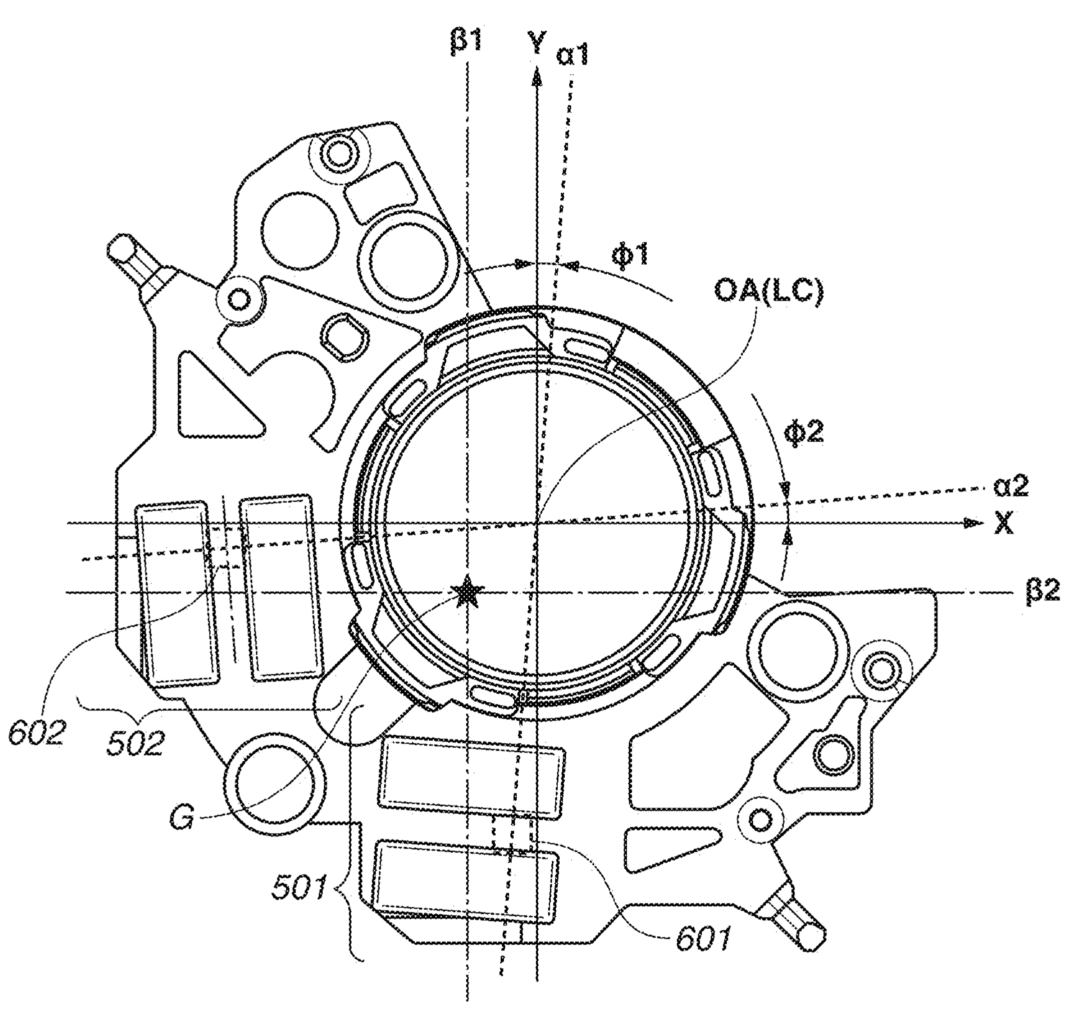
FIG. 3 illustrates the optical image stabilization apparatus as viewed from an image side.

FIG. 2 is an exploded view of the image stabilization unit 13 as viewed obliquely from the object side. FIG. 3 illustrates the image stabilization unit 13 as viewed from the image side.

The image stabilization unit 13 corrects image blur caused by camera shake, such as hand shake, detected by a shake sensor (not illustrated), such as an angular velocity sensor, by moving a correction lens L1 as an optical element in a direction including a component intersecting (orthogonal to) the optical axis OA.

The correction lens L1 is held by a movable member 200 and has the optical axis OA. The movable member 200 is held by a base member 210 to be movable within a movement plane via three rolling balls 300 arranged at three locations in a circumferential direction centered on the optical axis OA. The movable member 200 is biased toward the base member 210 in the optical axis direction along the optical axis OA by two tension springs 400 arranged at two locations in the circumferential direction. Accordingly, the movable member 200 is pressed against the base member 210 via the rolling balls 300 to be positioned in the optical axis direction and to be held movably within a plane intersecting the optical axis OA. According to the present exemplary embodiment, the movable member 200 is held by the three rolling balls 300 and two tension springs 400, but the number of rolling balls and tension springs are not limited to three and two, respectively, as long as the movable member 200 can be held movably within the movement plane.

The image stabilization unit 13 includes a voice coil motor (VCM) as a driving unit that drives the movable member 200. The voice coil motor includes an actuator 501 as a first driving unit and an actuator 502 as a second driving unit. Each actuator can move the movable member 200 in a different direction.

The actuator 501 (first driving unit) includes a driving magnet 511, a coil 521, and a yoke 531. The driving magnet 511 is fixed to the movable member 200. The coil 521 is fixed to the base member 210 to face the driving magnet 511 in a direction along the optical axis OA. The yoke 531 is formed in a plate shape from a ferromagnetic substance such as an iron-based metal and is fixed to the movable member 200 while being arranged on an opposite side of the coil 521 across the driving magnet 511 in the optical axis direction.

The actuator 502 (second driving unit) includes a driving magnet 512, a coil 522, and a yoke 532. The driving magnet 512 is fixed to the movable member 200. The coil 522 is fixed to the base member 210 to face the driving magnet 512 in the direction along the optical axis OA. The yoke 532 is formed in a plate shape from a ferromagnetic substance described above and is fixed to the movable member 200 while being arranged on an opposite side of the coil 522 across the driving magnet 512 in the optical axis direction.

In each actuator, the driving magnet and the yoke may be fixed to the base member 210, and the coil may be fixed to the movable member 200.

When a current is applied to the coil 521, the actuator 501 generates a driving force for driving the movable member 200 in a Y-axis direction illustrated in FIG. 3. When a current is applied to the coil 522, the actuator 502 generates a driving force for driving the movable member 200 in an X-axis direction illustrated in FIG. 3. The driving forces generated by the actuators 501 and 502 are controlled based on values of the currents applied to the coils 521 and 522, so that the movable member 200 can be driven in an arbitrary direction and to an arbitrary position within the movement plane.

As illustrated in FIG. 3, the actuator 501 has a first drive axis B1 that passes through a center of driving force generation along a direction (the Y-axis direction: a first driving direction) in which the driving force is generated and parallel to the movement plane. Similarly, the actuator 502 has a second drive axis B2 that passes through a center of driving force generation along a direction (the X-axis direction: a second driving direction) in which the driving force is generated and parallel to the movement plane. Here, the center of the driving force generation is, for example, the center of the coil facing each driving magnet fixed to the movable member 200 within a plane orthogonal to the optical axis OA. The first and second drive axes $\beta$1 and $\beta$2 do not have to be parallel to the Y-axis and the X-axis, respectively.

The image stabilization unit 13 is provided with a position sensor that detects a position of the movable member 200. The image stabilization unit 13 includes a first position detection unit and a second position detection unit as the position sensors. Each position sensor can detect the position of the movable member 200 in a different direction.

A position sensor 601 as the first position detection unit includes a magnetic sensor 621 such as a Hall element fixed to the base member 210 and the driving magnet 511 fixed to the movable member 200. The driving magnet 511 is fixed at a position facing the magnetic sensor 621.

A position sensor 602 as the second position detection unit includes a magnetic sensor 622 such as a Hall element fixed to the base member 210 and the driving magnet 512 fixed to the movable member 200. The driving magnet 512 is fixed at a position facing the magnetic sensor 622.

As illustrated in FIG. 3, the position sensor 601 has a first detection axis $\alpha$1 that passes through its detection center along a position detection direction (first detection direction) parallel to the movement plane of the movable member 200. The position sensor 602 has a second detection axis $\alpha$2 that passes through its detection center along a position detection direction (second detection direction) parallel to the movement plane of the movable member 200.

In the position sensor 601, the driving magnet 511 fixed to the movable member 200 moves in the first detection direction with respect to the magnetic sensor 621, and a magnetic field changes with respect to the magnetic sensor 621, so that an output signal from the magnetic sensor 621 is changed. Accordingly, the position of the movable member 200 in the first detection direction can be detected using the output signal from the magnetic sensor 621.

In the position sensor 602, the driving magnet 512 fixed to the movable member 200 moves in the second detection direction with respect to the magnetic sensor 622, and the magnetic field changes with respect to the magnetic sensor 622, so that an output signal from the magnetic sensor 622 is changed. Accordingly, the position of the movable member 200 in the second detection direction can be detected using the output signal from the magnetic sensor 622.

If each actuator is a VCM as according to the present exemplary embodiment, the driving force is generated by an action of the magnetic field of the driving magnet in the direction of the optical axis OA illustrated in FIG. 3 and a current flowing in a longitudinal direction of the coil. In this case, the direction in which the driving force is generated is perpendicular to both a direction of the magnetic field of the driving magnet and a direction of the current flowing in the coil. Thus, if the direction of the magnetic field is constant, the direction in which the driving force is generated is determined by arrangement of the coil.

The position sensor detects a change in the magnetic field caused by a change in a distance between the magnetic sensor and the driving magnet. More specifically, the position sensor detects a change in a distance in a direction perpendicular to a magnetically neutral position (magnetic neutral axis) between the magnetic sensor and the driving magnet. Thus, the direction in which the magnetic sensor detects a moving distance of the movable member 200 is determined by the direction of the magnetic neutral axis of the driving magnet.

As described above, the drive axis is determined by the arrangement of the coil within a plane perpendicular to the optical axis OA (the movement plane of the movable member 200). The detection axis is determined by the arrangement of the driving magnet within the plane perpendicular to the optical axis OA (the movement plane of the movable member 200). Thus, the drive axes ($\beta$1 and $\beta$2) and the detection axes ($\alpha$1 and $\alpha$2) can be set independently.

The arrangement of the actuators 501 and 502 and the position sensors 601 and 602 on an XY plane illustrated in FIG. 3 is described. Here, the arrangement is described in a state in which the movable member 200 is placed at a neutral position where a central axis LC (hereinbelow, referred to as the lens central axis LC) corresponding to the optical axis OA of the correction lens L1 coincides with the optical axis OA of the imaging optical system with respect to the base member 210 as illustrated in FIG. 3.

(Arrangement of Drive Axis)

As illustrated in FIG. 3, the X and Y axes are orthogonal to each other at the lens central axis LC (optical axis OA), which is the origin. As described above, the first drive axis β1 of the actuator 501 is parallel to the X-axis, and the second drive axis β2 of the actuator 502 is parallel to the Y-axis. The first and second drive axes β1 and β2 intersect at a position marked with a star (a center of gravity G) that is shifted toward the actuator (lower left side in FIG. 3) from the lens central axis LC. According to the present exemplary embodiment, the intersection point of the first and second drive axes β1 and β2 coincides with (overlaps with) the center of gravity G of the movable member 200. The term "coincide" here means that a deviation is allowed within a manufacturing error range. In other words, the intersection point of the first and second drive axes β1 and β2 is located closer to a center of gravity G of the optical axis OA. However, even if the intersection point is significantly deviated from the center of gravity G of the movable member 200, it is sufficient that the intersection point is located near the center of gravity G, and it is sufficient that the intersection point is located in a direction where the position of the center of gravity G of the movable member 200 is deviated with respect to the lens central axis LC.

(Arrangement of Detection Axis)

On the other hand, as illustrated in FIG. 3, the first detection axis α1 of the position sensor 601 and the second detection axis α2 of the position sensor 602 intersect at the lens central axis LC (the optical axis OA). In other words, the first and second detection axes α1 and α2 each pass through the lens central axis LC. The term "coincide" here means that a deviation is allowed within a manufacturing error range. However, even if the intersection point is significantly deviated from the central axis LC, it is sufficient that the intersection point is located near the central axis LC.

The above-described intersection point of the first and second drive axes β1 and β2 is located closer to the center of gravity G of the movable member 200 than an intersection point (the lens central axis LC) of the first and second detection axes α1 and α2.

The first detection axis α1 of the position sensor 601 is inclined at an angle φ1 with respect to the Y-axis in a clockwise direction around the lens central axis LC. Since the first drive axis β1 is parallel to the Y-axis, the first detection axis α1 is inclined with respect to the first drive axis β1. The second detection axis α2 of the position sensor 602 is inclined at an angle φ2 with respect to the X-axis in a counterclockwise direction around the lens central axis LC. Since the second drive axis β2 is parallel to the X-axis, the second detection axis α2 is inclined with respect to the second drive axis β2. According to the present exemplary embodiment, the detection axis being inclined with respect to the drive axis means that the angle φ is larger than 0°. For example, in a case where an allowable error in product assembly is 0.5°, the angles φ1 and φ2 according to the present exemplary embodiment are larger than 0.5°. Further, the angles φ1 and φ2 can be set in a range of 0.5° or more and 20° or less. In other words, of the angles formed between the first and second detection axes α1 and α2, the angle in an area where there is a midpoint of a line segment connecting the position sensor 601 and the position sensor 602 is not a right angle but an acute angle (an angle smaller than) 90°.

As illustrated in FIG. 3, the first detection axis α1 (detection direction) of the position sensor 601 does not coincide with the first drive axis β1 (driving direction) of the actuator 501 (is inclined with respect to the first drive axis β1). The second detection axis α2 (detection direction) of the position sensor 602 does not coincide with the second drive axis β2 (driving direction) of the actuator 502 (is inclined with respect to the first drive axis β1). How to calculate the positions of the movable member 200 in the X-axis direction and the Y-axis direction from the outputs of the position sensors 601 and 602 at this time is described below.

Figure 4:
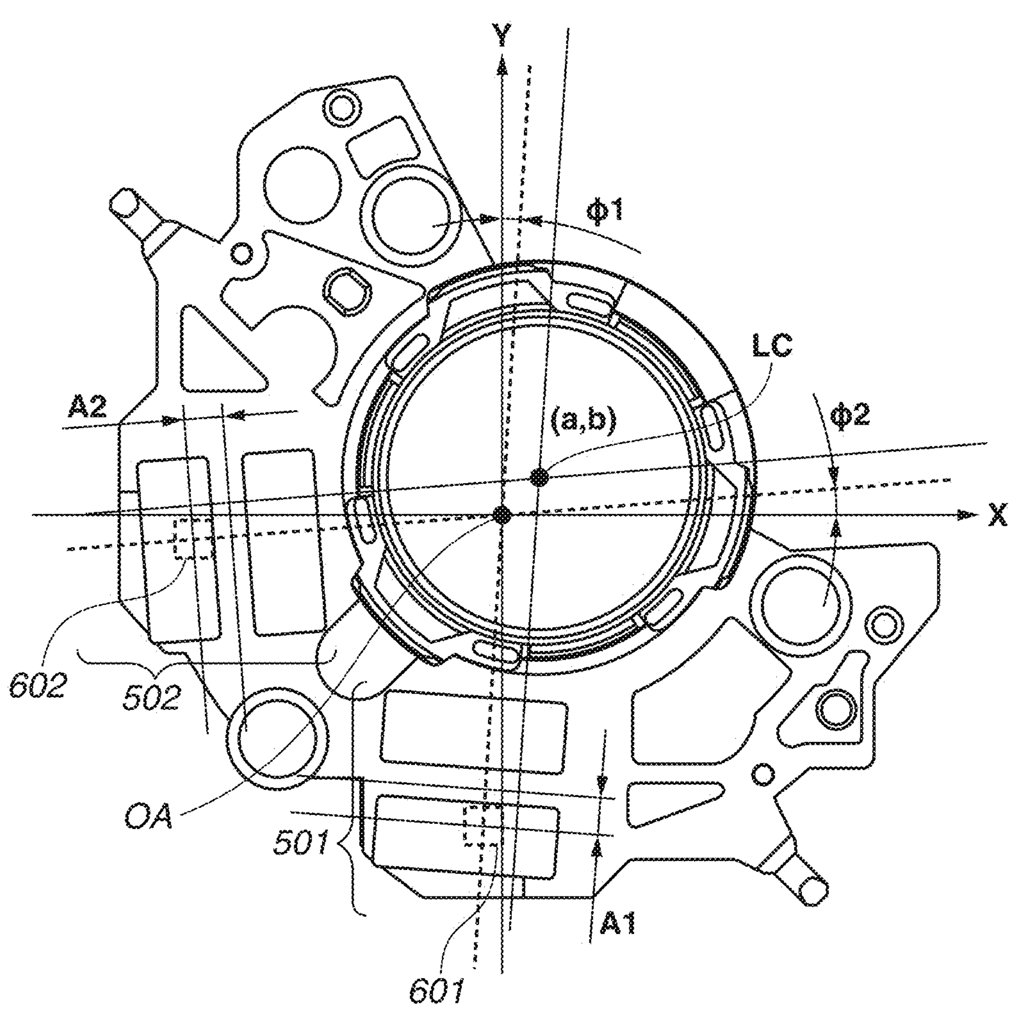
FIG. 4 is a rear view of the optical image stabilization apparatus.

The calculation of the position of the movable member 200 is described with reference to FIG. 4. FIG. 4 illustrates the image stabilization unit 13 as viewed from the image side, with the movable member 200 being moved from the neutral position with respect to the base member 210.

In the state illustrated in FIG. 4, the position sensor 601 detects and outputs a movement amount A1 of the movable member 200 in the first detection direction at the position sensor 601. The position sensor 602 detects and outputs a movement amount A2 of the movable member 200 in the second detection direction at the position sensor 602. At this time, the position (a, b) after the center of the correction lens L1 moved from the neutral position can be expressed by following equations (1) and (2).

$$a=(A1*\sin\varphi2+A2*\cos\varphi1)/(\cos\varphi1*\cos\varphi2-\sin\varphi1*\sin\varphi2) \quad (1)$$

$$b=(A1*\cos\varphi2+A2*\sin\varphi1)/(\cos\varphi1*\cos\varphi2-\sin\varphi1*\sin\varphi2) \quad (2)$$

In this way, even if the angle between the first and second detection axes α1 and α2 is not a right angle, the position (movement amount) of the correction lens L1 can be calculated by the above equations (1) and (2).

Figures 5A, 5B:
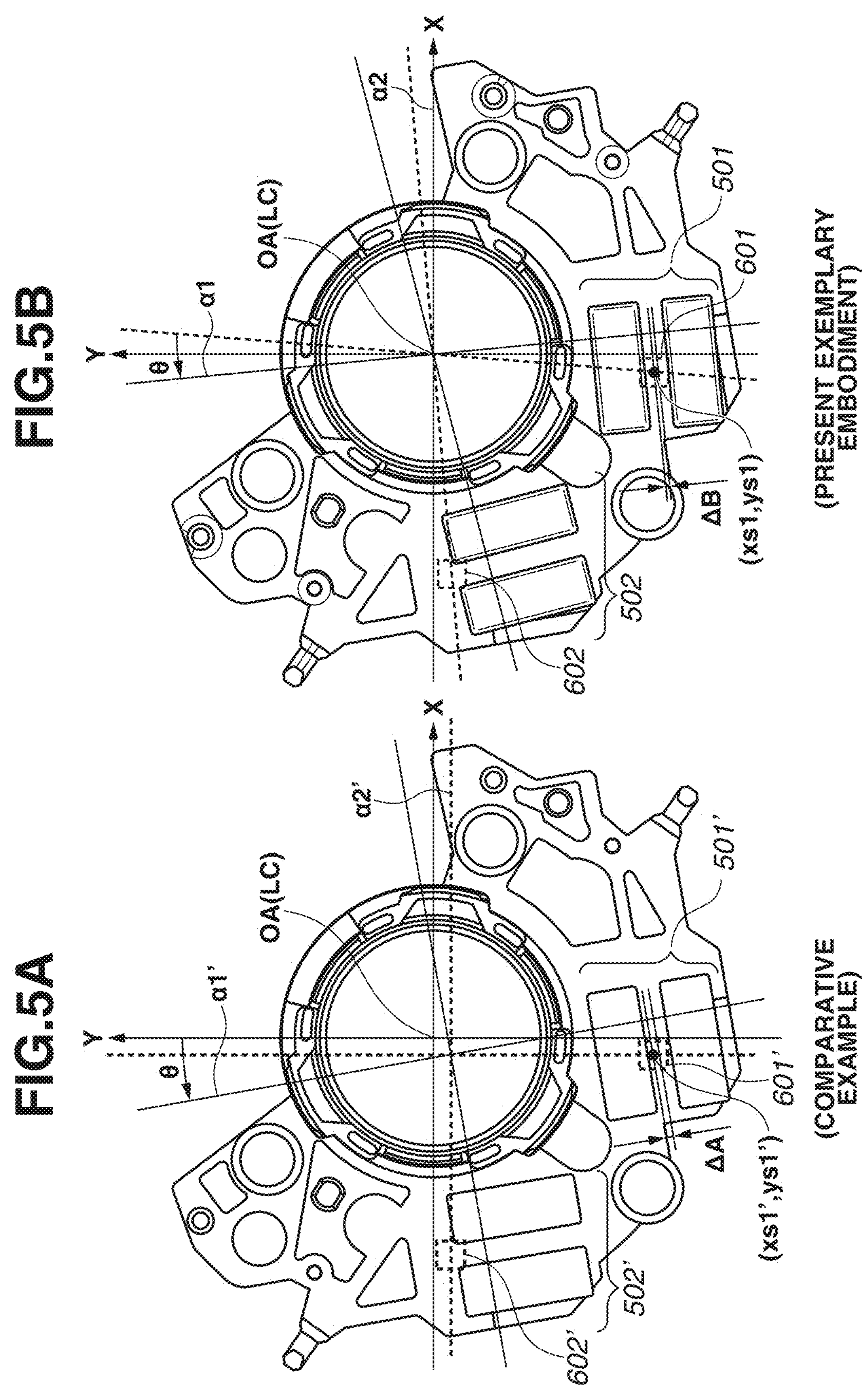
FIGS. 5A and 5B are rear views of optical image stabilization apparatuses.

A position detection error in a case where the movable member 200 rotates around the lens central axis LC is described with reference to FIGS. 5A and 5B. FIG. 5A illustrates an image stabilization unit as a comparative example as viewed from the image side, in which an angle between first and second detection axes α1' and α2' is a right angle, and the first and second detection axes α1' and α2' do not intersect on the lens central axis LC. FIG. 5B illustrates the image stabilization unit 13 according to the present exemplary embodiment as viewed from the image side, in which the angle between the first and second detection axes α1 and α2 is not a right angle, and the first and second detection axes α1 and α2 intersect on the lens central axis LC. In FIGS. 5A and 5B, the movable member 200 rotates by an angle θ around the lens central axis LC with respect to the base member 210, and the position sensors 601' and 601 also move to positions rotated by the angle θ from a position (xs1, ys1) in a case where the movable member 200 is not rotating.

In FIG. 5A, the position sensor 601' moves in the first detection direction (the Y-axis direction in which the first detection axis α1' extends) before rotation by an amount expressed by a following equation (3) due to the rotation by the angle θ of the movable member 200.

$$\Delta A = xs1 * \sin\theta + ys1 * (1 - \cos\theta) \quad (3)$$

Here, ΔA is a position detection error since the lens central axis LC, which is a rotation center, does not move. From the equation (3), it can be seen that the position detection error increases as the rotation angle θ of the movable member 200, that is, a distance between the first detection axis α1' and the lens central axis LC in the X direction increases.

On the other hand, in FIG. 5B, the position sensor 601 moves in the first detection direction (the direction in which the first detection axis α1 extends) before rotation by an amount expressed by a following equation (4) due to the rotation by the angle θ of the movable member 200.

$$\Delta B = (xs1^2 + ys1^2)^{0.5} * (1 - \cos\theta) \quad (4)$$

Here, ΔB is a position detection error, but (1−cos θ) can be regarded as minute in a range where the angle θ is small. The same is true for the position sensor 602.

Thus, according to the present exemplary embodiment, the position sensors 601 and 602 are arranged so that the intersection point of the first and second detection axes α1 and α2 is located on the lens central axis LC and the angle between the first and second detection axes α1 and α2 is a non-right angle. Accordingly, the position detection error can be suppressed in a case where the movable member 200 rotates around the lens central axis LC.

The intersection point of the first and second detection axes α1 and α2 does not necessarily have to be set on the lens central axis LC. However, as described with reference to FIG. 5A, the position detection error increases as the distance between each detection axis and the lens central axis LC increases, so that it is desirable to arrange the position sensors 601 and 602 to shorten the distance.

If the movable member 200 rotates around the lens central axis LC, an error occurs in the position of the correction lens L1 detected by the position sensor 601. At this time, the movement of the movable member 200 is controlled by setting a target position to a position deviated by an amount of the detected error from the current position of the correction lens L1, so that the movement amount of the correction lens L1 is insufficient or excessive with respect to the movement amount actually required. An error with respect to the target position causes residual image blur, and suppressing the position detection error leads to a reduction in residual image blur.

As described above, in order to efficiently drive the movable member 200 and accurately detect its position, it is desirable to suppress the rotation of the movable member 200 around the lens central axis LC to a small amount. With respect to the actuator 501, a rotation amount of the movable member 200 around the lens central axis LC is generated by a moment expressed as a product of a magnitude of the driving force generated by the actuator 501 and a distance between the first drive axis β1 and the center of gravity. Thus, in order to suppress the rotation of the movable member 200 caused by the driving force, it is desirable to locate the first drive axis β1 closer to the center of gravity of the movable member 200. The same is true for the actuator 502. In other words, it is desirable to locate the intersection point of the first and second drive axes β1 and β2 closer to the center of gravity than the intersection point of the first and second detection axes α1 and α2.

Generally, in a case where two actuators drive the movable member 200, the center of gravity of the movable member 200 is often located at a position separated from the lens central axis LC in the directions in which the two actuators are arranged. According to the present exemplary embodiment as well, as illustrated in FIG. 3, the center of gravity G of the movable member 200 is located at a position separated from the lens central axis LC in the directions in which the actuators 501 and 502 are arranged. However, according to the present exemplary embodiment, the intersection point of the first and second detection axes α1 and α2 is located on (or near) the lens central axis LC, and the intersection point of the first and second drive axes β1 and β2 is arranged closer to the center of gravity than the intersection point of the first and second detection axes α1 and α2. Accordingly, it is possible to suppress the rotation of the movable member 200 around the lens central axis LC while reducing the position detection error even if the movable member 200 rotates around the lens central axis LC.

According to the present exemplary embodiment, the case in which the first drive axis β1 is parallel to the Y-axis is described, but it is sufficient that the first detection axis α1 is inclined with respect to the first drive axis β1, and the first drive axis β1 may be arranged to be inclined with respect to the Y-axis. According to the present exemplary embodiment, the case in which the second drive axis β2 is parallel to the X-axis is described, but it is sufficient that the second detection axis α2 is inclined with respect to the second drive axis β2, and the second drive axis β2 may be arranged to be inclined with respect to the X-axis.

According to the present exemplary embodiment, the position of the movable member 200 is calculated from outputs of the position sensors 601 and 602, which are arranged so that the first and second detection axes α1 and α2 are not orthogonal to each other. The coils, the driving magnets, and the yokes are arranged so that the first and second drive axes β1 and β2 are located on (or near) the center of gravity of the movable member 200. Accordingly, the arrangement of the position sensors 601 and 602 is not limited so that the first and second detection axes α1 and α2 are orthogonal to each other, and the intersection point of the first and second detection axes α1 and α2 can be arranged on (or near) the lens central axis LC. Thus, it is possible to increase the degree of freedom in arrangement of the position sensors 601 and 602 while suppressing the position detection error in the movable member 200. The degree of freedom in arrangement of the position sensors 601 and 602 is increased, so that the respective position sensors 601 and 602 can be arranged at positions overlapping hollow core portions of the coils 521 and 522. Accordingly, even if the drive axis of the driving unit is arranged to match the center of gravity of the movable member, a small optical image stabilization apparatus can be realized without reducing detection accuracy.

While the exemplary embodiments have been described, it is to be understood that the invention is not limited to the disclosed exemplary embodiments, and various modifications and changes can be made without departing from the spirit and the scope of the present disclosure. The technologies disclosed in the exemplary embodiments can be applied to a lens barrel that can be attached to a camera main body such as a single-lens reflex digital camera and a mirrorless camera.

The scope of the following claims is to be accorded the broadest interpretation so as to encompass all such modifications and equivalent structures and functions.

This application claims the benefit of Japanese Patent Application No. 2023-187537, filed Nov. 1, 2023, which is hereby incorporated by reference herein in its entirety.

What is claimed is:

1. An optical image stabilization apparatus comprising:

a movable member configured to hold an optical element;

a base member configured to hold the movable member to be movable in a direction including a component orthogonal to an optical axis of the optical element;

a first position detection unit configured to detect a position of the movable member with respect to the base member in a direction of a first detection axis parallel to a plane orthogonal to the optical axis;

a first driving unit configured to drive the movable member with respect to the base member in a direction of a first drive axis parallel to the plane orthogonal to the optical axis, a second position detection unit configured to detect a position of the movable member with respect to the base member in a direction of a second detection axis parallel to a plane orthogonal to the optical axis; and a second driving unit configured to drive the movable member with respect to the base member in a direction of a second drive axis parallel to the plane orthogonal to the optical axis, wherein the first driving unit includes a coil and a magnet that is arranged at a position facing a direction along the optical axis with respect to the coil, wherein the first position detection unit is arranged at a position facing the direction along the optical axis with respect to the magnet and detects a position of the movable member in a direction of the first detection axis by detecting a change in a position of the magnet, wherein, as viewed along the optical axis, the first detection axis is inclined with respect to the first drive axis, and wherein the first detection axis and the second detection axis are not orthogonal to each other.

2. The optical image stabilization apparatus according to claim 1, wherein, as viewed along the optical axis, the first detection axis is closer to the optical axis than the first drive axis.

3. The optical image stabilization apparatus according to claim 1, wherein the first detection axis passes through the first position detection unit and is orthogonal to a magnetic neutral axis of the magnet included in the first driving unit.

4. The optical image stabilization apparatus according to claim 1, wherein the first drive axis passes through a center of the coil included in the first driving unit and is orthogonal to a longitudinal direction of the coil included in the first driving unit.

5. The optical image stabilization apparatus according to claim 1, wherein, as viewed along the optical axis, the first position detection unit is arranged closer to the optical axis in a longitudinal direction of the coil in an area overlapping with a hollow core portion of the coil included in the first driving unit.

6. The optical image stabilization apparatus according to claim 1, wherein, as viewed along the optical axis, an intersection point of the first detection axis and the second detection axis is closer to the optical axis than an intersection point of the first drive axis and the second drive axis.

7. The optical image stabilization apparatus according to claim 1, wherein, as viewed along the optical axis, an intersection point of the first detection axis and the second detection axis is located on the optical axis of the optical element.

8. The optical image stabilization apparatus according to claim 1, wherein, as viewed along the optical axis, an intersection point of the first drive axis and the second drive axis is located closer to a center of gravity of the movable member with respect to the optical axis.

9. The optical image stabilization apparatus according to claim 1, wherein the second driving unit includes a coil and a magnet that is arranged at a position facing a direction along the optical axis with respect to the coil, and wherein the second position detection unit is arranged at a position facing the direction along the optical axis with respect to the magnet and detects a position of the movable member in a direction of the second detection axis by detecting a change in a position of the magnet.

10. The optical image stabilization apparatus according to claim 1, wherein the first drive axis and the second drive axis are orthogonal to each other.

11. A lens apparatus comprising:

an optical image stabilization apparatus and a lens barrel configured to accommodate the optical image stabilization apparatus and to hold a lens, wherein the optical image stabilization apparatus comprising:

a movable member configured to hold an optical element;

a base member configured to hold the movable member to be movable in a direction including a component orthogonal to an optical axis of the optical element;

a first position detection unit configured to detect a position of the movable member with respect to the base member in a direction of a first detection axis parallel to a plane orthogonal to the optical axis;

a first driving unit configured to drive the movable member with respect to the base member in a direction of a first drive axis parallel to the plane orthogonal to the optical axis, a second position detection unit configured to detect a position of the movable member with respect to the base member in a direction of a second detection axis parallel to a plane orthogonal to the optical axis; and a second driving unit configured to drive the movable member with respect to the base member in a direction of a second drive axis parallel to the plane orthogonal to the optical axis, wherein the first driving unit includes a coil and a magnet that is arranged at a position facing a direction along the optical axis with respect to the coil, wherein the first position detection unit is arranged at a position facing the direction along the optical axis with respect to the magnet and detects a position of the movable member in a direction of the first detection axis by detecting a change in a position of the magnet, wherein, as viewed along the optical axis, the first detection axis is inclined with respect to the first drive axis, and wherein the first detection axis and the second detection axis are not orthogonal to each other.

12. An image capturing apparatus comprising:

a lens apparatus and an imaging element configured to capture an image of an object via the optical element, wherein the lens apparatus comprising:

an optical image stabilization apparatus and a lens barrel configured to accommodate the optical image stabilization apparatus and to hold a lens, wherein the optical image stabilization apparatus comprising:

a movable member configured to hold an optical element;

a base member configured to hold the movable member to be movable in a direction including a component orthogonal to an optical axis of the optical element;

a first position detection unit configured to detect a position of the movable member with respect to the base member in a direction of a first detection axis parallel to a plane orthogonal to the optical axis;

a first driving unit configured to drive the movable member with respect to the base member in a direction of a first drive axis parallel to the plane orthogonal to the optical axis, a second position detection unit configured to detect a position of the movable member with respect to the base member in a direction of a second detection axis parallel to a plane orthogonal to the optical axis; and a second driving unit configured to drive the movable member with respect to the base member in a direction of a second drive axis parallel to the plane orthogonal to the optical axis, wherein the first driving unit includes a coil and a magnet that is arranged at a position facing a direction along the optical axis with respect to the coil, wherein the first position detection unit is arranged at a position facing the direction along the optical axis with respect to the magnet and detects a position of the movable member in a direction of the first detection axis by detecting a change in a position of the magnet, wherein, as viewed along the optical axis, the first detection axis is inclined with respect to the first drive axis, and wherein the first detection axis and the second detection axis are not orthogonal to each other.

* * * * *